United States Patent
Ayastuy

(10) Patent No.: US 7,201,186 B2
(45) Date of Patent: Apr. 10, 2007

(54) ELECTRONIC VALVE FOR FLOW REGULATION ON A COOKING BURNER

(75) Inventor: Iñaki Ayastuy, Bergara (ES)

(73) Assignee: Coprecitec, S.L., Aretxabaleta (ES)

( * ) Notice: Subject to any disclaimer, the term of this patent is extended or adjusted under 35 U.S.C. 154(b) by 26 days.

(21) Appl. No.: 11/228,916

(22) Filed: Sep. 16, 2005

(65) Prior Publication Data
US 2006/0076529 A1    Apr. 13, 2006

(51) Int. Cl.
F17D 1/04 (2006.01)
F16L 55/00 (2006.01)
K16K 31/00 (2006.01)

(52) U.S. Cl. ............... 137/601.19; 251/129.11; 251/121

(58) Field of Classification Search ......... 137/601.18, 137/601.19, 599.16; 251/325, 120, 129.11, 251/121, 324, 205, 206
See application file for complete search history.

(56) References Cited

U.S. PATENT DOCUMENTS

| | | | | |
|---|---|---|---|---|
| 2,514,506 A | * | 7/1950 | Mueller | 137/599.16 |
| 2,652,226 A | * | 9/1953 | Huff | 251/96 |
| 4,644,968 A | * | 2/1987 | Chatterjea | 137/599.16 |
| 4,862,917 A | * | 9/1989 | Genbauffe | 137/599.17 |
| 5,133,383 A | * | 7/1992 | King | 137/625.3 |
| 7,073,532 B2 | * | 7/2006 | Bowe | 137/625.33 |

* cited by examiner

Primary Examiner—Eric Keasel
Assistant Examiner—Andrew J. Rost
(74) Attorney, Agent, or Firm—The Kline Law Firm

(57) ABSTRACT

The gas flow regulating valve (1) is adapted to one cooking burner amongst the several on a cooking hob. The regulating valve member (7) is cylindrical-shaped and coupled to a step motor "M", which controls the axial displacement "X" thereof through a fixed closure member (8), over successive positions (P0–P6) effecting the regulation of an outlet gas flow "Q" between the OFF and a minimum flow Qmin. The regulating member (7) is provided with at least one elongated superficial recess (9,9') communicating the inlet side (3a) with the outlet side (3b) of the gas chamber, a regulating surface opening (9,11) provided with a surface groove (11) adjacent to said superficial recess (9) towards the outlet side (3b), in the form of a variable passage area (A,H) for the regulation of a intermediate flow Qgra, and at least one gas through-flow conduit (12) in permanent communication with the outlet side (3b) for a calibrated flow Qmin.

10 Claims, 4 Drawing Sheets

ELECTRONIC VALVE FOR FLOW REGULATION ON A COOKING BURNER

DESCRIPTION

The present invention relates to a valve for regulating the flow of gas supplied to a cooking burner, operated by means of an electronically-controlled motor, the valve regulating member being the cylindrical type, which slides linearly to vary a gas through-flow section.

PRIOR ART

Well known are gas flow regulating valves of the type defined above, adapted to a cooking hob surface burner, as disclosed in GB-2219066-A, supplying a flow variable between a maximum flow and a minimum flow in accordance with two valve member ON positions, and with a separate OFF position. A step motor arranged at one end of the valve body operates the regulating valve by means of an electronic control circuit, from the cooking appliance controls.

The gas regulating valve for a cooking burner disclosed in EP-A-0692681 and its equivalent U.S. Pat. No. 5,544,856 is operated electrically, displacing a valve member linearly in a gas chamber communicated with a gas inlet and a gas outlet to the burner. The valve member is cylindrically shaped and slides snugly through the hole in a transverse valve seat. The cylindrical valve member has a decreasing section surface groove which slides along the wall of the seat hole, thereby achieving a transverse through-flow area that varies with the linear forward movement of the valve member.

DISCLOSURE OF THE INVENTION

The object of the invention is a valve regulating the flow of gas to a cooking hob surface burner, the valve being operated by means of a step motor and the closure member moved linearly in a gas chamber in communication with an inlet conduit, supplying a variable forward-movement-dependent flow to an outlet conduit, between a maximum flow and a minimum flow position, starting from a shut-off position, by means of reducing a through-flow area in the closure member.

An objective of the present regulating valve is a form of construction of the flow regulating valve components for the supply of a flow of gas to the burner which should be gradually variable in response to the action of the motor, and the power of the outlet flow to the burner should be regulated smoothly, irrespective of the family of the fuel gas regulated, over the whole stroke effected by the regulating member.

A further objective of the present patent is a gas flow regulating valve, intended for the individual supply of the various burners of different outputs installed on a cooking hob, of simple economical construction, which will withstand a large number of regulating valve member shift operations, with the same precision and without the appearance of gas leaks brought about by wear in the valve regulating components.

The regulating valve according to the invention is built with a cylindrically-shaped regulating valve member, provided with a variable section surface groove, which is in communication with the flow outlet chamber, and which slides over a fixed transverse closure member in the valve body. The cylindrical member is moved linearly by a valve shaft and progressively exposes a through-flow opening to the gradually decreasing outlet chamber, starting from a shut-off position (OFF) up to another minimum flow end position, Qmin. The regulating valve is controlled by a step motor which requires little power to effect the sliding movement of the cylindrical member, since the closure member has a flexible sealing ring for the sliding contact with practically no friction.

The minimum flow Qmin is regulated by a calibrated hole in permanent communication with the outlet chamber. It is particularly complicated to graduate a small intermediate gas flow close to Qmin, especially when the gas supplied is butane and the burner regulated is low power. For the regulation of an intermediate flow between the Qmax and Qmin flows, when the desired low is close to Qmin, the regulating surface groove terminates in a V-shaped end of groove converging in the direction of forward movement, for purposes of regulating the intermediate flow close to a minimum flow. The end of the V-section surface groove is precision-machined on the cylindrical valve member, and it is valid with the same size and length for the smooth regulation of said small flow of whatsoever gas family may be supplied and for all the different burner outputs.

An advantage of this regulating valve is the adaptation of the same valve structure design and flow-regulating member for their application to the various burners of different outputs on a cooking hob and to the different gas families. The regulating valve member is made of a single cylindrical piece, for easy fitting in the body of the valve, this piece being the same for all the different powered burners and different gas families. In cases of a different burner or gas family, regulation is adjusted by means of a change in the relationship of the valve member forward movement to the motor control signal. The Qmin of any of the fuel gas families is achieved by means of the exchange of a bypass screw fitted in the free end of the cylindrical regulating member.

DETAILED DESCRIPTION OF A PREFERRED EMBODIMENT

Figure 1:
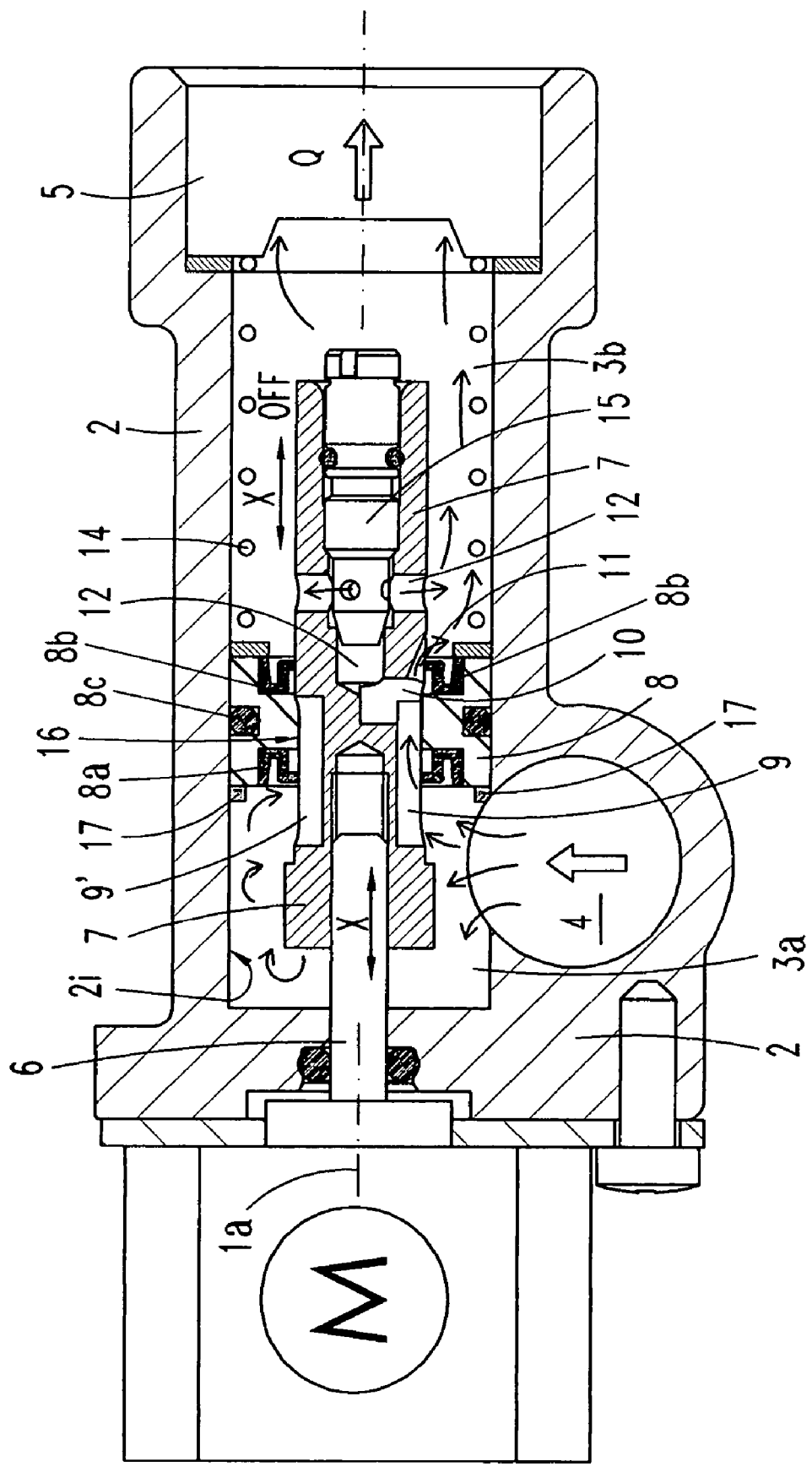
FIG. 1 is a sectional view of a gas flow regulating valve with a step motor in a position corresponding to an intermediate flow.

In reference to FIGS. 1–6, an embodiment of regulating valve 1 comprises a cylindrically-shaped hollow valve body 2 forming an elongated gas circulation chamber 3, provided with a gas inlet conduit 4 and an outlet conduit 5 from the valve in communication with the gas chamber 3, and with a step motor "M" coupled at one end of the body by means of a shaft 6 coaxial with a valve body centreline 1a, a valve regulating member 7 moved linearly in a controlled fashion in both axial directions "X" for regulating a gas outlet flow "Q", and a valve closure member 8 in the form of a disc held stationary in a fixed position in respect of the valve body, between the inlet conduit 4 and the outlet conduit 5.

In a preferred embodiment the valve member 7 is of an elongated cylindrical shape, coupled at one end to the valve shaft 6 and to the motor M. The closure disc 8 is secured transversely in the gas chamber 3 against the inner wall 2$i$ of the body, forming on either side an inlet chamber 3$a$ and outlet chamber 3$b$, in communication with a respective conduit 4 ó 5. The closure disc 8 is held in a fixed reference position in relation to movement X by means of a compression spring 14, which presses it up against an annular stop 17 on the inner wall 2$i$ of the body. In addition, a peripheral sealing ring 8$c$ of the closure disc 8 is pressed against this inner wall 2$i$ of the chamber 3, isolating both chambers 3$a$ and 3$b$ from each other.

The closure disc 8 is of considerable thickness "th" and every one of its flat faces incorporates a "lip" type sealing ring 8$a$, 8$b$ projecting towards its central hole 16. The closure disc 8 is traversed coaxially by the regulating member 7. The two lipped sealing rings 8$a$, 8$b$ are at said distance "th" apart from each other in the direction of movement "X". The lipped edges 8$a$, 8$b$ make sliding contact on the surface of the cylindrical member 7, undergoing elastic deformation to open and close the passages of gas flow "Q" through cylindrical member 7, either wholly or partly, from the inlet chamber 3$a$ to the outlet chamber 3$b$.

Figure 4:
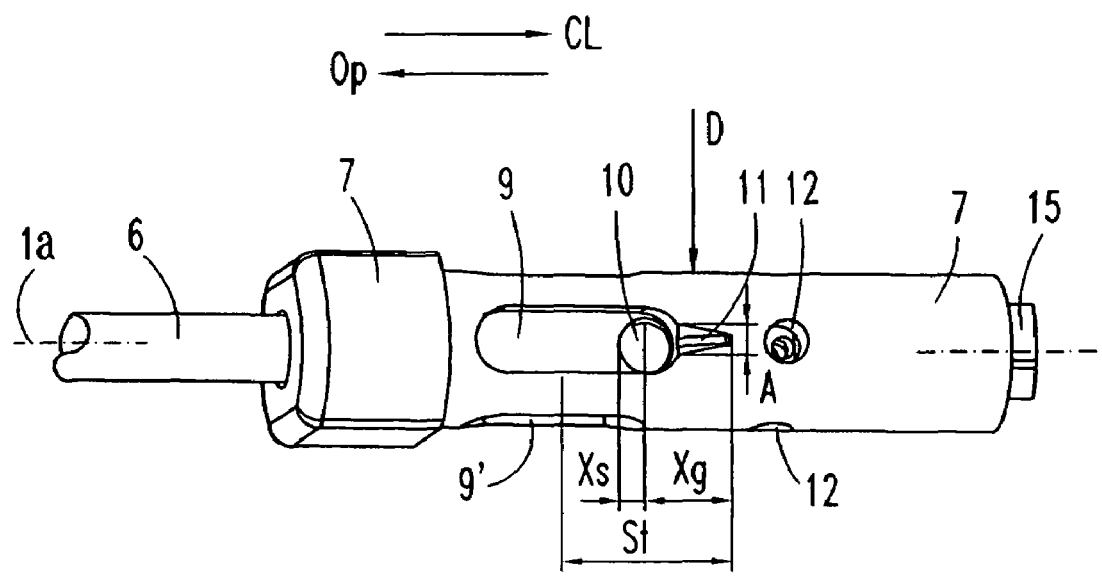
FIG. 4 is a perspective view of the regulating member of the valve in FIG. 1.
Figure 2:
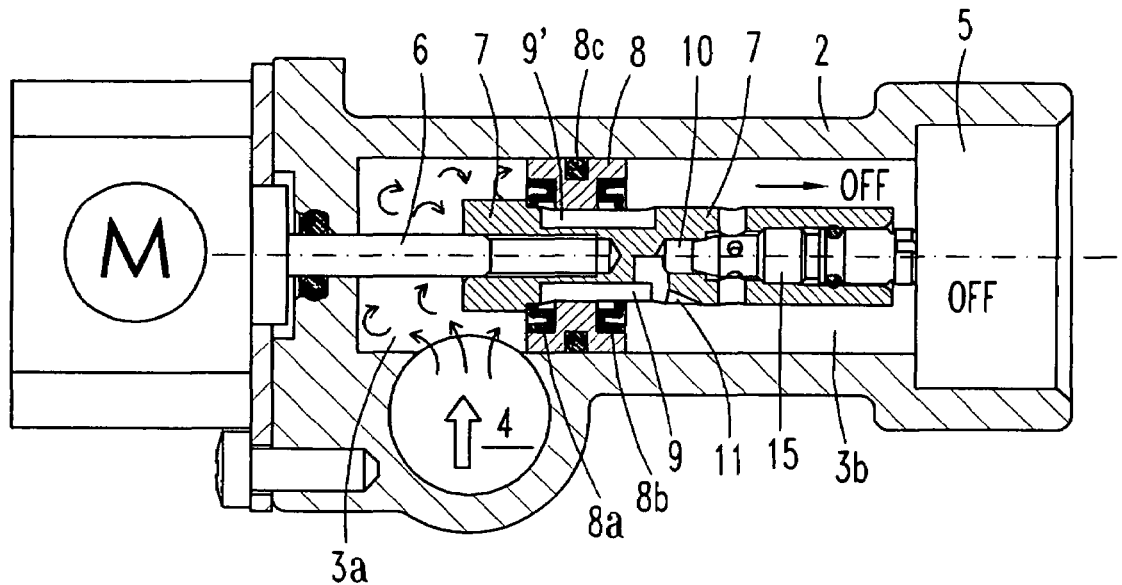
FIG. 2 is a sectional view of the valve in FIG. 1, in a valve closed position.
Figure 3:
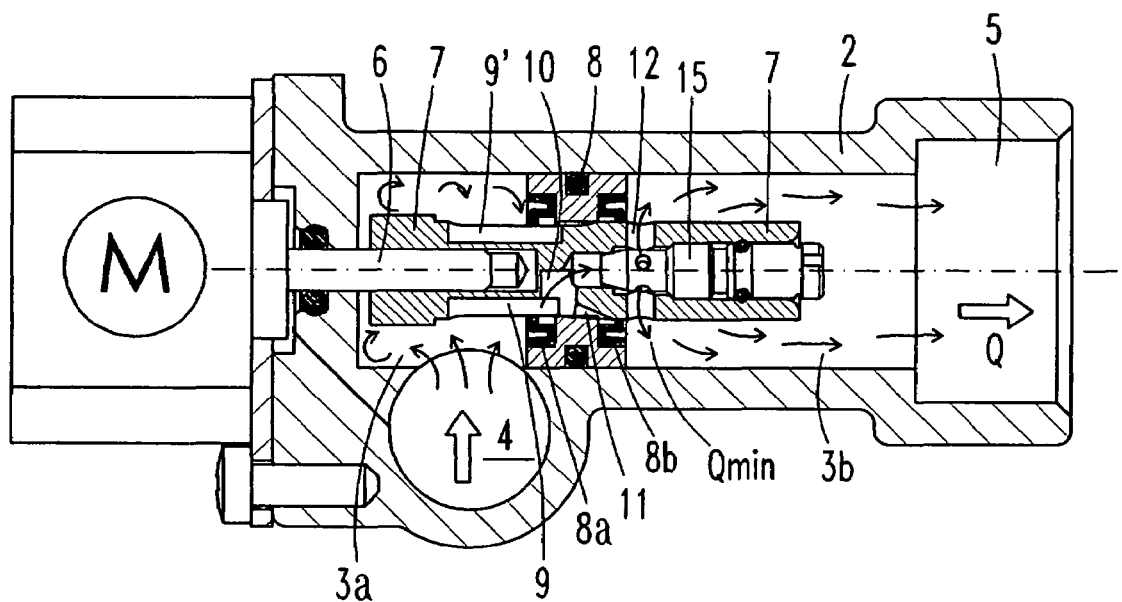
FIG. 3 is a sectional view of the valve in FIG. 1, in a position corresponding to a minimum flow.
Figure 6:
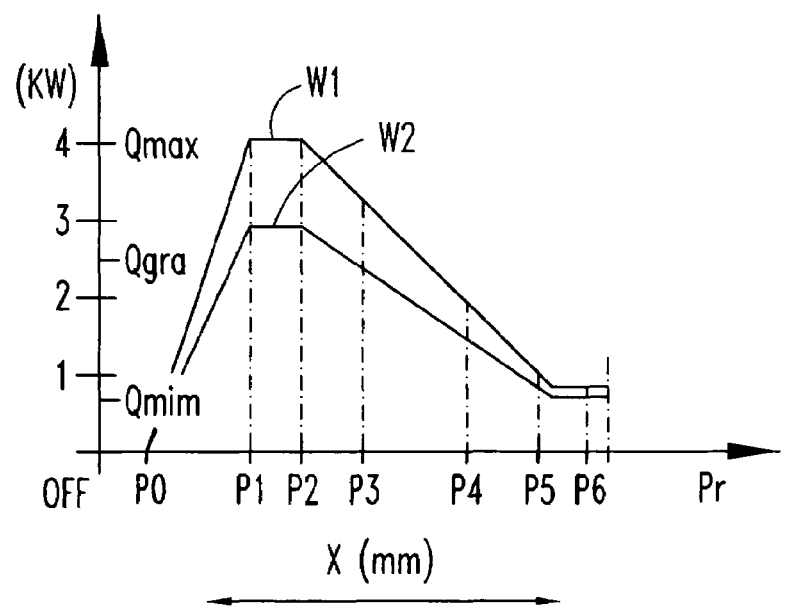
FIG. 6 is a diagram showing the outgoing gas flow from the valve in accordance with the relative position of the regulating member in FIGS. 4 and 5.

In a preferred embodiment of valve 1, the regulating member 7 shown in FIG. 1, FIG. 4 and FIG. 6 is provided with one or more gas passages in the form of superficial recesses 9, 9' communicating with both inlet and outlet chambers 3$a$, 3$b$, a gas passage in the form of a drill hole 12 communicating with said outlet 5, and an intermediate passage opening preferably effected in the form of a surface groove 11 with a V-shaped section of decreasing area. Preferably, the regulating member 7 is provided with two elongated superficial recesses 9, 9' located on the cylindrical surface 7, spaced angularly apart from each other. Both recesses 9, 9' have a length greater than the thickness "th" of the closure disc 8, and they may therefore be in communication with both the inlet 3$a$ and the outlet chamber 3$b$, so they form inlet and outlet openings for gas flow "Q". A first superficial recess 9 is situated in line with the V-shaped groove 11, and it is approximately 1 mm longer than the second superficial recess 9', whereby in a relative intermediate position of the regulating member 7, the second recess 9' cooperates in the supply of a maximum flow Qmax when it is in communication with both chambers 3$a$, 3$b$. When the second recess 9' is already completely closed to the outlet chamber 3$b$, being longer, the first recess 9 also supplies an intermediate flow Qgra, so it is also called the regulating recess 9.

An inner radial hole 10 drilled in a position (FIGS. 4 and 5) on the superficial regulating recess 9 establishes a conducting branch 10, 12 between the chambers 3$a$, 3$b$ calibrated for a minimum flow Qmin, always open from the initial opening movement X of valve 1. The Qmin for different gas families is calibrated by means of a bypass screw 15 fitted in the free end of the cylindrical member 7, communicated with the intermediate hole 10. In the event of natural gas being supplied as fuel, owing to its comparatively lower heat capacity than the other gas families, the Qmin will be supplied by way of the area of the converging end of the V-groove 11, since its value is comparatively much higher than the Qmin of LP gas necessary.

Figure 5:
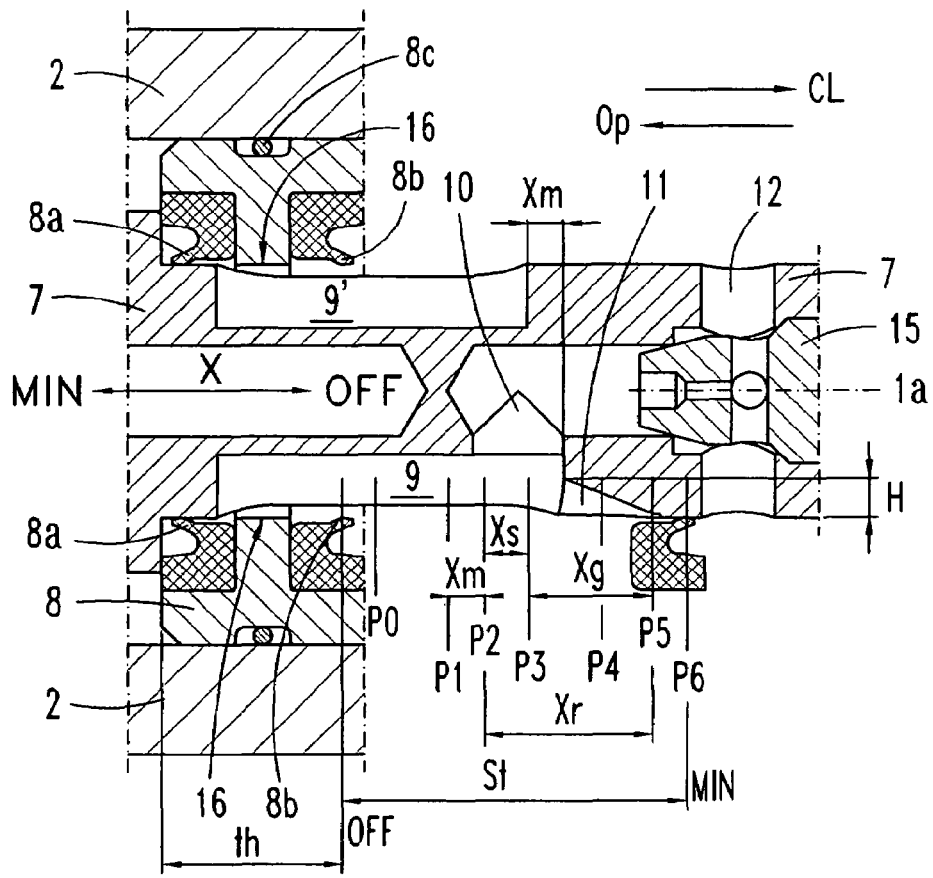
FIG. 5 is a partial view of the valve regulating plug, showing the relative position between the regulating member and the closure member.

In reference to FIG. 4 to FIG. 6, with the regulating member 7 displaced in the direction of the motor M—"Op" arrow in FIG. 4—the surfaces recesses 9,9' are situated in successive relative positions "Pr", in reference to the fixed plane of the sealing lip 8$b$. The resulting outlet flows "Q" have been represented graphically in FIG. 6, for supply to two burners of different outputs W1 and W2. The closure disc 8 is retained all the time in a fixed position, pressed by the spring 24 up against an internal stop 17 in the valve body. In this way, the recesses 9, 9' and the adjustable V-groove 11 slide over the sealing lip 8$b$.

For the regulation of gas flow "Q" starting from the shut-off position OFF towards Qmax and afterwards towards Qmin, a movement of the regulating member is preferred towards the motor according to the arrow "Op", with a total stroke "St", and for the return of the regulating member 7 to its initial home position, the regulating member is moved towards the end of motor M, according to arrow "CL" in FIG. 4. When the regulating member 7 is moved by the motor M in direction "X" to supply the required flow Q, Qmax, Qgra, Qmin, the end of the superficial recesses 9, 9' and the V-groove slide along the central hole 16 in the closure disc 8 and communicate the outlet chamber 3$b$ with the part of the superficial recesses 9, 9' in communication with the inlet chamber 3$a$. The superficial recess 9 aligned with the V-groove 11 is approximately Xs=1 mm greater in length than the other parallel longitudinal recess 9'. This end portion Xs of the longitudinal recess 9 provides an intermediate flow outlet Qgra after the Qmax setting, between the relative positions P2 and P3 in FIG. 5 and FIG. 6.

Figure 1A:
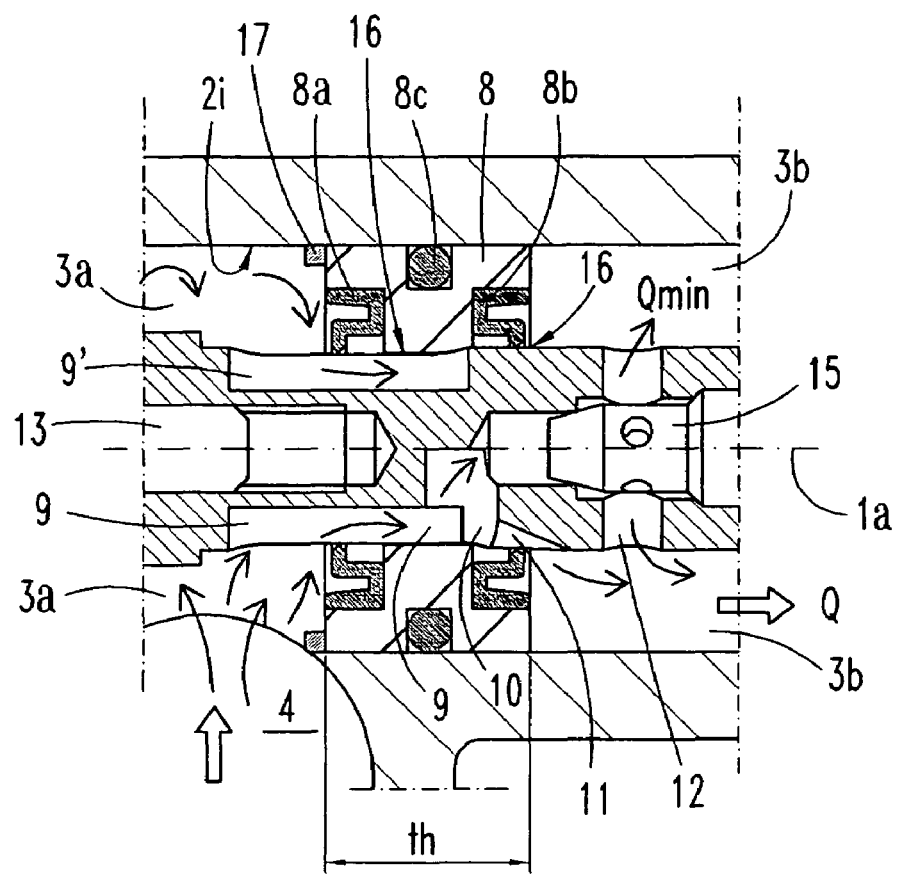
FIG. 1A is a partial view of the valve as FIG. 1, showing a close view of the gas flow regulating plug.

In reference to FIG. 5 and FIG. 6 observed at the same time, the manner of operating of the regulating 11 for regulating the flow Q supplied is as follows: the regulating member 7 is moved by the shaft 6 along the gas chamber 3, sliding through of the closure member 8 to different relative positions OFF, P0–P6, MIN. The movement X of the regulating member 7 in the "open" direction indicated by the arrow "Op" begins from an "OFF" position cutting off the gas flow Q, a condition shown in FIG. 2, continues via a "MAX" position of a flow Qmax not shown in the drawings, to the next position P2, also Qmax, an intermediate position P3, P4, P5 with outlet of an intermediate flow "Qgra", a condition shown in FIG. 1 and FIG. 1A, and finishes with a third movement between two relative positions P5, P6, MIN to supply said flow "Qmin", a condition shown in FIG. 3.

The regulating member 7 moves by sliding over the lipped seals 8, 8$b$ from its relative position OFF to its relative position MIN. The superficial recesses 9, 9' slide over the first sealing lip between the relative positions P0 and P1 opening up the passage of flow C from the inlet chamber 3$a$. A large bore area for Qmax, which is the sum of the ends of the recesses 9, 9', is placed in communication with the outlet chamber 3$b$. The maximum flow Qmax for the output chosen W1, W2 in the corresponding cooking burner is established by means of different movements X for one burner or another, and it is maintained during a movement "Xm" between the relative positions P1 and P2. Continuing movement X, the length of recess 9' is closed completely, and now a flow Qgra less than Qmax leaves the outlet chamber 3$b$ from the end of the recess 9, between positions P2 and P3. The portion of length Xg between the end of the recess 9 and the V-groove 11 now slides over the sealing lip 8$b$, gradually exposing a flow section to the outlet chamber gently decreasing in accordance with the electrical operating signal transmitted to the motor M, whereby an outlet flow "Qgra" is established closely adapted to a small power output required close to the minimum flow Qmin. The regulation of a flow Qgra of natural gas close to Qmax, which is large due to its low calorific power, is regulated gradually from a prior position P3, by way of the end portion of the surface groove 9, which is adjacent and in longitudinal succession with the V-groove 11, its outlet area being substantially larger than the latter. The intermediate butane gas flow Qgra is regulated by way of the V-groove 11 only. In particular, it is hard to regulate gradually for the cooking burner of lower output W2, an intermediate butane gas flow Qgra close to Qmin by means of a final movement X. In an advanced position P4 of the flow Qgra close to Qmin it is the V-shaped groove 11 which provides the final fine adjustment. From position P5, P6, MIN motor M moves the regulating member 7 in the direction X opposite to "closing", indicated by arrow "CL" in FIG. 4, for the return of the regulating member 7 to the shut-off state OFF of supply Q.

The surface configuration of the first passage recess 9 is rectangular, preferably finishing in a semi-circle (FIG. 4) intersecting the V-groove 11, whereby the recess 9 provides a termination with an opening of decreasing area in respect to the rectangular area of the recess 9, connected with the V-groove, which is likewise of decreasing area. The V-groove 11 exhibits an outlet area in the form of an elongated surface triangle-shapep of a width "A", converging towards the end of the regulating member 7 next to the outlet 5. The cross section of the V-groove 11 is also decreasing from a depth "H" (FIG. 5) below the cylindrical surface towards the outlet conduit 5 and terminating in an apex on the surface. The triangular area of the V-groove 11 is added to the final rounded portion of the recess 9, forming an outlet surface of length "Xg" in the direction of movement, between the relative positions P3 and P5 (FIG. 5 and FIG. 6) for a smooth graduation of an intermediate flow Qgra.

In an embodiment of the invention the power of the burner is W1=4 Kw or W2=2.8 Kw, as two examples of the burners amongst the many of a cooking hob; the overall stroke of the cylindrical member St=8 mm approximately; the forward movement X=0.5 mm/revolution of motor M; the movement X between the relative regulating positions P0 and P5, X=5 mm; the length of the regulation area of a gentle flow Qgra Xg=4 mm; the diameter of the regulating member 7, D=5.8 mm; the width "A" of the V-groove 1=1.4 mm; the greatest height of the V-groove, H=1 mm; the thickness of the closure disc 8, th=6 mm.

What it is claimed is:

1. A gas flow regulating valve adapted to one cooking burner amongst several on a cooking hob, comprising:

a hollow valve body (2) forming a cylindrical-shaped gas circulation chamber (3) on the inside, with a gas inlet conduit (4) from a source and an outlet conduit (5) from the valve, a step motor (M) coupled at a one end of the valve body (2) by means of a valve shaft (6) coaxial with a valve body centreline (1a), a valve closure member (8), provided with sealing means (8a,8b,8c) so as to define an inlet side (3a) and the outlet side (3b) of the gas chamber, and keep them isolated from each other, and which, being held in a fixed position relative to said valve body (2), is provided with a central through-hole (16) for gas flow (Q) from said inlet side (3a) towards said outlet side (3b), a regulating valve member (7) cylindrical-shaped, whose axial movement (X) through said closure member (8) is controlled by motor (M) over a whole stroke (St) of successive positions (P) relative to the closure member (8) between two extreme positions (P0, P6), effecting the regulation of an outlet gas flow (Q) between the flow shut-off (OFF), a maximum flow (Qmax), a graduated intermediate flow (Qgra), and a minimum flow (Qmin), depending on the length (Xm, Xg) of the movement (X) made, said cylindrical regulating member (7) is provided with at least one elongated superficial recess (9, 9') for the passage of the gas flow (Q), communicating the inlet side (3a) with the outlet side (3b) by way of said centre hole (16) in the closure member, a surface opening (9,11) for gas passage provided with a surface groove (9, 11) adjacent to said communication superficial recess (9) at the outlet side (3b), and configured in the form of a groove extending in the axial direction, the through-flow area (A) thereof being open in a layout convergent towards said outlet side (3b) for the regulation of the intermediate flow (Qgra), wherein said superficial recess (9, 9'), after a prior initial movement (OFF-P0) of the regulating member (7), is partly open towards the inlet side (3a) and towards the outlet side (3b) as well, so as to establish the predetermined flow Qmax, and said regulating surface groove (9,11) being of longitudinally variable section, is gradually opened to the output chamber (3b) in accordance with a second regulated movement (Xr) between two relative positions (P3, P5), for the supply of an intermediate flow (Qgra) between said predetermined flows Qmax and Qmin, according to the output (W1, W2) of the cooking burner chosen and the gas family supplied.

2. The gas flow regulating valve according to claim 1, wherein said surface opening (9, 11) for the gradual regulation of the intermediate flow (Qgra) is formed with a through-flow area gradually decreasing in the direction (X) towards the free end of the cylindrical member (7) next to the outlet conduit (5), by means of a V-shaped section groove (11), with both the surface area A and the radial section (H) being convergent in the form so as to obtain a smooth and precise graduation of the intermediate flow (Qgra) of the "LP" gas for burners of different outputs (W1, W2).

3. The gas flow regulating valve according to claim 1, wherein said surface opening (9, 11) for the gradual regulation of the intermediate flow (Qgra) is formed with a through-flow area gradually decreasing in the direction (X) towards the free end of the cylindrical member (7) next to the outlet conduit (5), by means of a final portion o the superficial recess (9) on the inlet side (3a) and a V-shaped section groove (11) in longitudinal succession with the final portion of the recess (9) in the inlet, so as to obtain a smooth and precise regulation of an intermediate natural gas flow (Qgra) for the burners of different outputs (W1, W2).

4. The gas flow regulating valve according to claim 1, wherein the cylindrical regulating member (7) has an intermediate hole (10) drilled radially on said superficial recess (9) on the inlet side (3a), and at least a through-flow conduit (12) in the regulating member (7) situated permanently on the outlet side (3b), is communicated with said intermediate radial hole (10) for the supply only of flow Qmin, by means of a third movement between two final relative positions (P5, P6) of the regulating member (7).

5. The gas flow regulating valve according to claim 1, wherein said closure member (8) is constructed in the form of a closure disc (8) heal in a fixed position in relation to the valve body (2), and it is provided with a sealing ring (8a, 8b) on each of its sides in the direction X over which the cylindrical regulating member (7) is slid, said rings (8a, 8b) being spaced from each other a given length (th) for the partial covering between them of said superficial recess(es) (9, 9') on the inlet side (3a) to obtain a flow Qmax, and when the regulating member (7) effects final movement (X), covering said adjacent surface groove (9, 11) entirely so as to obtain the flow Qmin only.

6. The gas flow regulating valve according to claim 1, wherein said closure member (8) is constructed in the form of a closure disc (8) heal in a fixed position in relation to the valve body (2), and it is provided with a sealing ring (8a, 8b) on each of its sides in the direction X over which the cylindrical regulating member (7) is slid, said rings (8a, 8b) being spaced a given distance (th) apart from each other for the partial covering between them of said superficial recess (es) (9, 9') on the inlet side (3a) to obtain a flow Qmax, and the regulating member (7) is provided with a superficial recess (9) on the inlet side formed with an end portion of decreasing area in direction X, and said surface groove (11) for the gradual regulation of the flow (Qgra) is configured in "V" form and situated adjacent to said end portion of the superficial recess (9), whereby, when the regulating member (7) effects a final movement (X), at the same time it covers said surface groove (9, 11) and said final portion of the recess (9) on the inlet side (3a), so as to obtain the minimum flow (Qmin) only.

7. A gas flow regulating valve adapted to one cooking burner amongst several on a cooking hob, comprising:
   a hollow valve body (2) forming a cylindrical-shaped gas circulation chamber (3) on the inside, with a gas inlet conduit (4) from a source and an outlet conduit (5) from the valve,
   a step motor (M) coupled at a one end of the valve body (2) by means of a valve shaft (6) coaxial with a valve body centreline (1a),
   a valve closure member (8), provided with sealing means (8a,8b,8c) so as to define an inlet side (3a) and the outlet side (3b) of the gas chamber, and keep them isolated from each other, and which, being held in a fixed position relative to said valve body (2), is provided with a central through-hole (16) for gas flow (Q) from said inlet side (3a) towards said outlet side (3b),
   a regulating valve member (7) cylindrical-shaped, whose axial displacement (X) through said closure member (8) is controlled by motor (M) over a whole stroke (St) of successive positions (P) relative to the closure member (8) between two extreme positions (P0, P6), effecting the regulation of an outlet gas flow (Q) between the flow shut-off (OFF), a maximum flow (Qmax), a graduated intermediate flow (Qgra), and a minimum flow (Qmin), depending on the length (Xm, Xg) of the displacement (X) made,
   said cylindrical regulating member (7) is provided with at least one elongated superficial recess (9, 9') for the passage of the gas flow (Q), communicating the inlet side (3a) with the outlet side (3b) by way of said centre hole (16) in the closure member, a regulating surface opening (9, 11) provided with a surface groove (11) adjacent to said superficial recess (9) towards the outlet side (3b), and configured in the form of a variable passage area (A, H) extending in the axial direction for the regulation of the intermediate flow (Qgra), and
   at least one gas through-flow conduit (12) in permanent communication with the outlet side (3b) for the supply only of a calibrated flow (Qmin),
   wherein said superficial recess (9, 9'), after a prior initial movement (OFF-P0) of the regulating member (7), is partly open towards the inlet side (3a), establishing on the outlet side (3b) a predetermined flow (Qmax), and said regulating surface opening (9, 11) is gradually open following a second displacement (Xr) between two relative positions (P3, P5) for the supply of the intermediate flow (Qgra), according to the output (W1, W2) of the cooking burner chosen and the gas family supplied, by means of the successive covering of a final portion of the superficial recess (9) and of the regulating surface opening (9,11) between said side sealing means (8a, 8b) of the closure member, in accordance with the length movement (X) made.

8. The gas flow regulating valve according to claim 7, wherein said regulating surface opening (9, 11) gradually open is configured with a V-shaped through-flow area (11) which gradually decreases in the direction (X) towards the free end of the cylindrical member (7) next to the outlet conduit (5), having both the surface area (A) and the radial section (H) being convergent in form so as to obtain a smooth and precise graduation of the intermediate flow (Qgra) of the "LP" gas for burners of different power (W1, W2).

9. The gas flow regulating valve of claim 7, wherein the cylindrical regulating member (7) comprises an intermediate hole (10) drilled radial on said superficial recess (9) on the inlet side (3a), and said through-flow situated permanently on the outlet side (3b), is communicated with said radial intermediate hole (10) by means of a third movement between two final relative positions (P5, P6), for the supply of the flow Qmin only.

10. The gas flow regulating valve according to claim 7, wherein a bypass screw (15) calibrated for the supply of the flow Qmin is provided in an axial housing at the free end of the cylindrical regulating member (7), in permanent communication with said superficial recess (9, 9') on the inlet side (3a).

* * * * *